April 30, 1968  E. A. WINSTON  3,380,159
CUTTING DEVICE
Filed Feb. 25, 1966  2 Sheets-Sheet 1

INVENTOR.
EMANUEL A. WINSTON
BY Dominik & Stein
ATTYS.

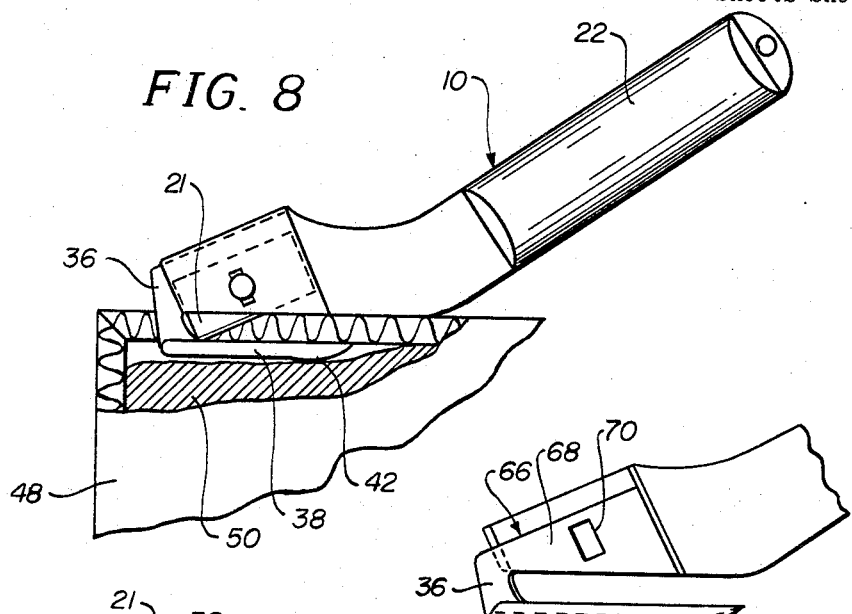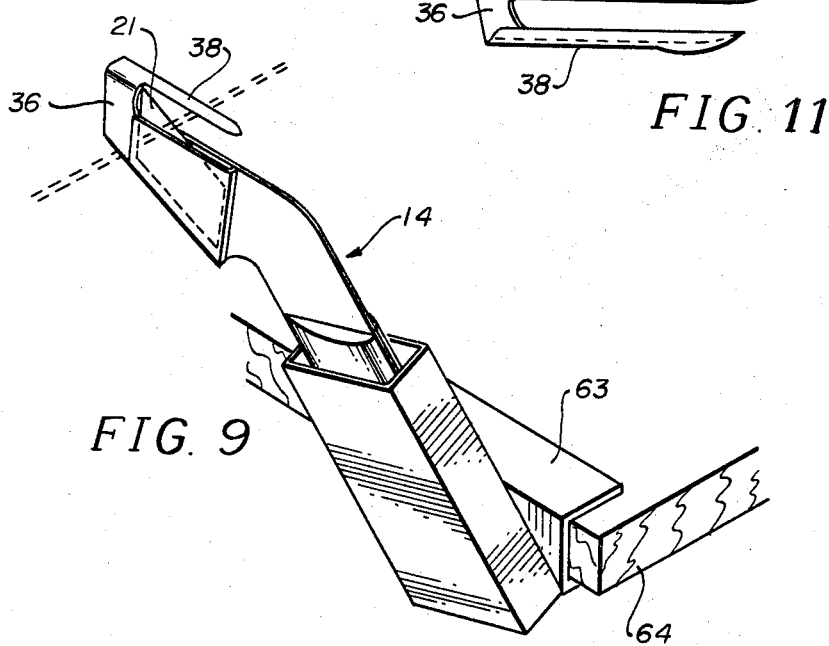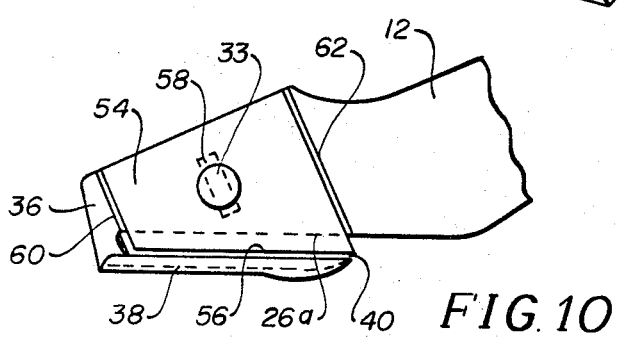

3,380,159
CUTTING DEVICE
Emanuel A. Winston, 2925 W. Touhy Ave.,
Chicago, Ill. 60645
Filed Feb. 25, 1966, Ser. No. 530,003
5 Claims. (Cl. 30—293)

ABSTRACT OF THE DISCLOSURE

A cutting device for opening shipping containers and the like consisting of a handle with an adjustable slot at the lower end, and a runner at the extreme lower end with a pointed tip to penetrate the walls of the shipping container and with a cutting blade across said slot to cut the adjacent wall of said container without damage to the contents.

---

This invention relates to cutting tools, and more particularly to cutting devices for opening shipping containers and the like of cardboard or similar material, which are designed to prohibit the damaging of the mechandise contained therein.

Carton cutting and razor blade holding devices for opening shipping cartons of cardboard or similar material are presently available. Each of these devices, however, is generally unsatisfactory, for one reason or another. For example, probably the biggest objection is the fact that the devices do not provide or have satisfactory means to protect the merchandise contained within the shipping cartons from being damaged when the shipping cartons are cut open. As a consequence, there is substantial losses in both time and money to the manufacturers as well as the retail merchandisers.

Manufacturers of merchandise such as cereal, soap powder, powdered sugar, pudding and the like are frequently asked to receive back, at full credit, boxes which have been slashed when the cartons in which they are shipped are opened. In many cases, to establish or maintain good will, the manufacturers will accept them, however, the losses they sustain in doing so frequently equals the retail shelf price of the merchandise.

As far as the retailers of the merchandise, the damaged boxes are generally discovered only after they have been shelved. They have already incurred costs for invoicing, handling, opening and shelving the merchandise and now, in addition, they must try to salvage and sell it at lower prices, or dispose of it. Alternatively, if the manufacturer is willing to accept return of the damaged merchandise, they must re-pack it for shipment, invoice it and ship it. In either case, the losses are substantial.

Accordingly, the cutting device of the present invention is designed in a fashion such that the most inexperienced freight handler, store clerk, stock boy or anyone opening the shipping cartons can open them quickly and easily, without subjecting the boxes of merchandise contained therein to damage by slashing them. While the cutting device is primarily intended to be used for opening shipping cartons and the like, it can also be used for cutting material such as roofing material, asphalt shingles and floor tiles as well as a whole host of other materials, and for a string cutter, in which case it can be mounted so that a string can be easily engaged and cut by it.

More specifically, the cutting device has a foot or runner integrally formed with a handle which is adapted to support a cutting blade. The runner is pointed so that a carton can be punctured with it, and is further formed so that it will ride inside of the carton with minimum resistance and without damaging the boxes in the cartons. The cutting blade is positioned with respect to the handle and the runner such that it cannot penetrate the carton to a depth beyond the inner-most edge of the runner so that it also cannot damage the boxes. In use, the tip of the runner is simply forced into the edge of the carton and the cutting device pulled along the side of the carton, to cut the carton along the line traversed with it.

The handle and the runner are further adapted so that the cutting blade can be extended beyond the runner to expose its cutting edge so that the cutting device also can be used as an ordinary knife blade. By adjustably positioning the blade at a predetermined distance below the runner and guiding the runner across the surface of an object, the depth to which the cutting blade will penetrate the object also can be controlled.

The runner on the handle forms a hook which can be used to engage a string, and the string can be drawn back over the cutting blade to cut it. The cutting device therefore can function as a string cutter and, furthermore, can be permanently mounted for such a purpose, if desired.

It is therefore an object of the present invention to provide improved cutting devices. More particularly, an object is to provide improved cutting devices for opening shipping cartons and the like of cardboard or similar material which are designed to prohibit the damaging of the merchandise contained therein.

Another object is to provide improved cutting devices which are particularly adapted for opening shipping cartons and the like of cardboard or similar material which are, in addition, adapted to be used as an ordinary knife blade. In this respect, it is further contemplated that the knife blade be adjustably positionable so that its cutting edge can penetrate an object to only a predetermined depth.

Still another object is to provide cutting devices of the above type which are adaptable to be used as string cutters.

Still another object is to provide improved cutting devices of the described type which are designed to offer minimum desistance as they are drawn through an object to cut it.

Another object is to provide improved cutting devices having handles which are positioned to provide clearance for a person's fingers and knuckles when slitting an object, and are also adapted to provide storage for extra blades.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 8 is a view illustrating the use of the cutting device for opening a cardboard shipping carton or the like;

FIG. 9 is a view illustrating the manner in which the cutting device can be mounted for use as a string cutter; and FIGS. 10 and 11 are partial side plan views illustrating alternative constructions of the cutting device to provide means for adjusting the width of the slot.

Similar reference characters refer to similar parts throughout the several views of the drawings.

Figure 1:
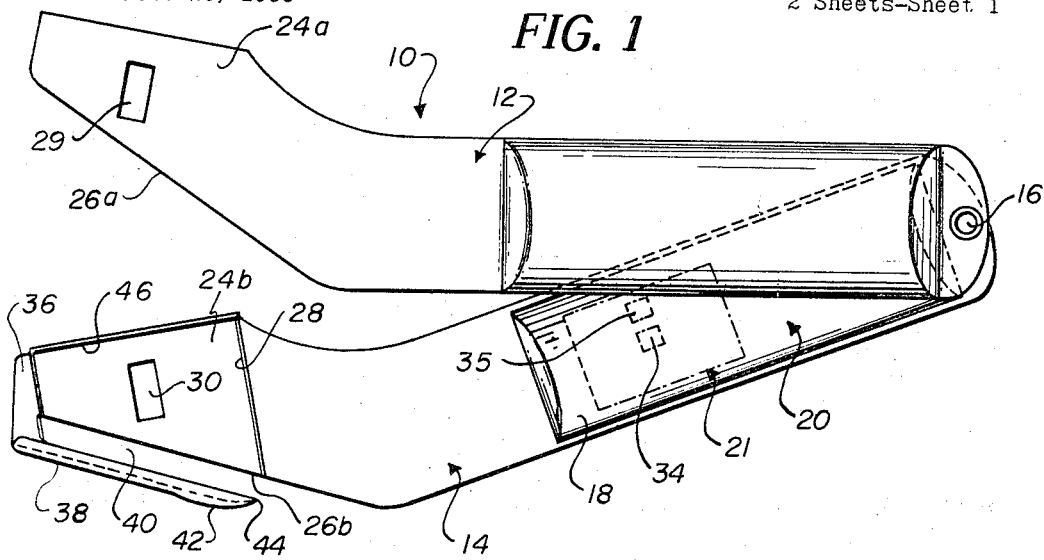
FIG. 1 is a side plan view of a cutting device exemplary of the invention, illustrated in a pivotally opened position and further illustrating the blade storage compartment within the handle.

Referring now to the drawings, a cutting device 10 exemplary of the invention is illustrated formed of two flat sheets 12 and 14 which are preferably a substantially heavy gauge sheet metal and which are pivotally affixed to one another at one end by a pivot pin or rivet 16. The sheets 12 and 14 each are formed, as by stamping them, to provide oppositely disposed cavities 18 (only one of which can be seen in FIG. 1) between them. When the sheets 12 and 14 are fitted together, the interior surfaces of the cavities 18 function to form a cutting blade storage compartment 20 for cutting blades 21 (shown in phantom in FIG. 1) and the exterior surfaces thereof form a handle 22 (FIG. 8). The handle 22 can be knurled, if desired, to provide a better gripping surface.

The ends 24a and 24b of the sheets 12 and 14 opposite the handle 22 each are formed to provide a cutting blade retainer 24. The edges 26a and 26b of the sheets form a straight edge 26 on the retainer 24 which is angularly disposed with respect to the handle 22 to provide a clearance for the knuckles and fingers of someone using the cutting device 10.

The end 24b of the sheet 14 has a recessed blade cavity 28 formed therein which is of substantially the same depth as the thickness of a cutting blade 21, so that the cutting blade will seat therein and will be flush with the top surface of the sheet 14. The blade cavity 28 also has a width which corresponds to the width of a cutting blade 21 and is angularly disposed with respect to the straight edge 26a, and hence the straight edge 26 of the retainer 24. A cutting blade 21 within the blade cavity 28 is therefore angularly disposed with respect to the straight edge 26, and is prevented from shifting its angular position therein by the side edges of the blade cavity.

Figure 2:
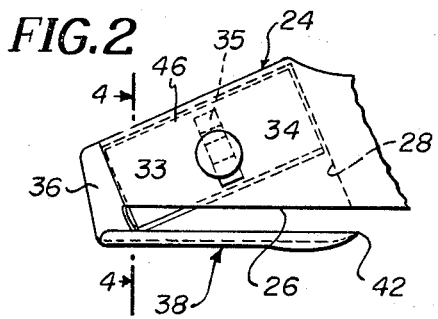
FIG. 2 is a partial side plan view illustrating the manner in which a cutting blade is affixed therein, in accordance with a first embodiment of the invention.
Figure 3:
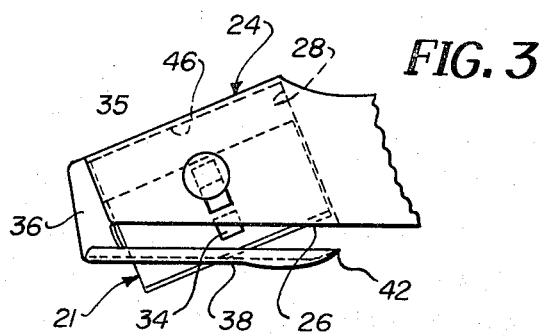
FIG. 3 is a partial side plan view illustrating the manner in which a cutting blade is affixed therein, in accordance with a second embodiment of the invention.
Figure 4:
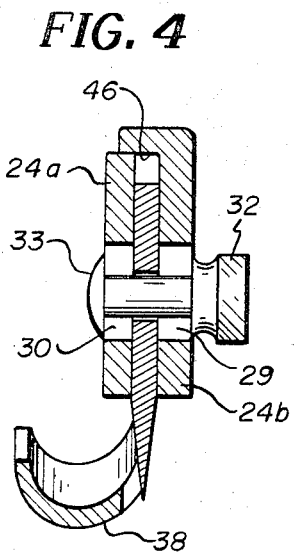
FIG. 4 is an enlarged sectional view, taken along lines 4—4 of FIG. 2.
Figure 5:
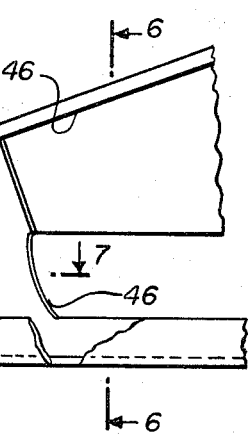
FIG. 5 is a partial side plan view illustrating the runner support structure.
Figures 6, 7:
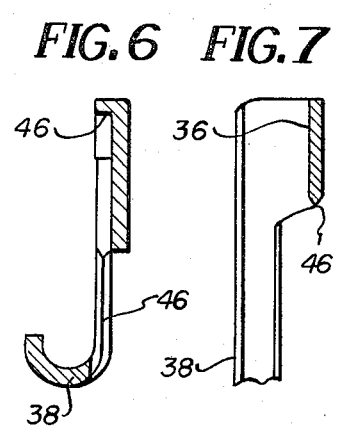
FIG. 6 is a sectional view, taken along lines 6—6 of FIG. 5.
FIG. 7 is a sectional view, taken along lines 7—7 of FIG. 5.

The ends 24a and 24b have slotted apertures 29 and 30 therein, respectively, which are disposed within the blade cavity 28 and are correspondingly aligned to receive fastening means, such as the threaded nut 32 and shoulder bolt 33, for securing the sheets 12 and 14 to one another. The cutting blades 21 each have an aperture 34 (best seen in FIG. 1) therein, and the shoulder bolt 33 also extends through the apertures 34 in the cutting blades to fixedly secure them within the blade cavity 28, as illustrated in FIGS. 2-4.

The end 24b of the sheet 14 extends beyond the end 24a of the sheet 12 and is formed to provide a runner support 36 and a runner 38. The runner support 36 extends below the straight edge 26b, and the runner 38 is folded to extend substantially perpendicular to it and in a parallel spaced relation to the straight edge 26b so as to form a slot 40. The slot 40 is preferably approximately ¼ inch in width so that all standard size cardboard can pass through it, in a manner described below. The runner 38 is elongated and extends rearwardly toward the handle 22. Preferably it is approximately 1½ inches long, however, other lengths may be used which will function to protect the merchandise within a shipping carton. The runner 38 preferably has a cross section which is semi-round for structural strength to allow it to pierce cardboard and the like without buckling or flexing. Also, the outwardly curved surface thereof faces away from the slot 40 to provide protection for the merchandise within a shipping carton by allowing only a minimal amount of the runner to be in touch with the merchandise. The contour of the curved surface of the runner also bows slightly outwardly at 42 and from that point it flows into a pointed tip 44 for puncturing and penetrating material to be cut. The slight bow at 42 functions to effectively push the merchandise engaged by the runner away from its tip 44 when drawing the runner against and past merchandise within a shipping carton and the like.

In assembling the cutting device 10, a cutting blade 21 is placed in the blade cavity 28, with the top edge of the cutting blade butted against the upper edge 46 of the blade cavity. In this position, the cutting blade 21 extends diagonally across a portion of the slot 40 but its tip does not extend beyond the runner 38 so the tip is not exposed. It may also be noted that the cutting blade 21 lies directly in front of and in the plane of the runner support 36 so that the latter follows the cutting blade through the cut made by the cutting blade. The runner support 36 thereby offers little resistance in traversing the cut. To eliminate snagging and to further decrease any resistance offered by the runner support, its leading edge 46 is preferably sharpened to provide a cutting edge. It need not be sharpened, however, and satisfactory operation is still provided.

The two sheets 12 and 14 forming the cutting device 10 are pivoted together to align the apertures 29 and 30 therein, and the shoulder bolt 33 extended through them. It may be noted that the shoulder bolt 33 also extends through the aperture 34 in the cutting blade 21 which is now sandwiched between the two sheets 12 and 14 within the blade cavity 28. The nut 32 is threaded onto the shoulder bolt 33 to fixedly secure the cutting device in assembled condition, ready for use.

Referring now to FIG. 8 which illustrates the manner in which the cutting device 10 is used to cut open a cardboard shipping carton 48, the cutting device is held by its handle 22, with the straight edge 26 of the blade retainer 24 placed flat against the side wall of the carton at one corner and the tip 44 is placed against the other side wall forming the corner. Using a pulling motion, the tip 44 is pulled through the side wall and into the interior of the carton. Resting the straight edge 26 on the side wall of the carton in this fashion will permit the tip 44 to pierce the carton only at a predetermined angle so that the tip will not pierce the merchandise within the carton. The cutting device 10 is continued to be pulled along the side wall of the carton, with the straight edge 26 sliding on the side wall thereof, as illustrated in FIG. 8. It can be seen that the side wall is retained within the slot 40, and is engaged and cut by the cutting blade 21 thereby forming a continuous cut along the side wall. The runner support 36 follows directly behind the cutting blade 21, and is therefore disposed within the cut formed by the cutting blade and offers little resistance or friction to the movement of the cutting device. The bow at 42 engages against any merchandise, such as the boxes 50, within the shipping carton and effectively pushes the merchandise away from the tip 44 of the runner 38 to prevent the merchandise from being pierced and thereby damaged by it. The curved surface of the runner 38 will allow the runner to slide along the surface of the merchandise, without leaving any scratches or crease marks which would mar the merchandise. Also, since the tip or cutting edge of the cutting blade is confined to the area of the slot 40, the merchandise is protected from being accidently slashed as the carton side wall is cut. Damage to the merchandise is therefore prevented. It may be further noted that the tip 44 of the runner 38 extends substantially parallel with the inner side of the runner so that the tip will slide along and will not repuncture the interior surface of the side wall, as the cutting device is pulled.

From this description it can be seen that the straight edge 26 restrains the user from improper usage of the cutting device. The long straight plane of the straight edge 26 prevents the user from effecting an angle or inwardly biased cut either at the beginning of the cut, when the carton is first pierced by the point of the runner 38, or after the carton has been pierced and the cut is being made. If the user tilts or attempts to angle the cutting device, the cutting action is stopped. The cutting device cannot be pulled in the direction of the desired cut, thereby preventing any action which would result in the runner 38 piercing the merchandise contained in the carton. It is virtually impossible for the user to achieve an angle which results in the merchandise being pierced, without piercing the carton with the entire straight edge 26.

Contrasting the described action to that of available cutting devices, in the case of the latter both a pressing down and a pulling action to achieve the cutting is required. The pressing down action is necessary since insufficient pressure will allow the blade or angled cutting edge to slide out of the cut or slit. It will be appreciated that this creates a dangerous situation, for the blade upon riding out of the cut while being pulled can slash out of control, resulting in slashed clothing, or worse yet, serious injury to the user. With the cutting device of the present invention, the pressing down action is eliminated and only the pulling action is needed so that it can be used without fear of injury or damage to clothing or other objects.

The runner 38 also functions as an inside guide for cutting the top off of a carton. The edge of the runner is engaged against the inside surface of the top and guides the cutting blade 21 across the side wall approximately ¼ inch down from the inside surface of the top. By traversing the edge of the carton in this manner, the entire top can be easily and quickly removed.

The handle 22 being angularly disposed with respect to the blade retainer 24 permits the handle to be firmly gripped and provides clearance for the user's fingers and knuckles. Also, as indicated above, the handle 22 contains a cutting blade storage compartment 20 for extra cutting blades. Access is gained to the compartment 20 by removing the nut 32 and bolt 33 and sliding the two sections apart, about the pivot pin 16.

The width of the slot 40 can be varied so that the cutting device can be used to cut materials having different thicknesses. This is accomplished by loosening the nut 32 and pivotally sliding the two sheets apart so that the straight edges 26a and 26b on the sheets 12 and 14 are displaced with respect to one another, to thereby increase or decrase the width of the slot 40. To cut material of a particular thickness, the width of the slot 40 is adjusted to substantially correspond to the thickness of the material so that the material is confined therein and the runner 38 will slidingly engage one surface of the material as the straight edge 26 is slidingly engaged with the opposite surfaces.

In FIG. 10, there is illustrated an alternate manner in which the width of the slot 40 can be adjusted. In this case a plate 54 having a straight edge 56 is affixed to the sheet 12 with its straight edge 56 aligned with the straight edge 26a.

The plate 54 has an aperture 58 therein positionably aligned with the slotted aperture 29 so that the nut 32 and belt 33 can be used to affix it to the sheet 12 also. The plate 54 is slidably adjustable to increase or decrease the width of the slot 40 by loosening the nut 32 and bolt 33. The sheet 12 may have upstanding ridges 60 and 62 formed thereon for providing guide slots in which the plate 54 can slide, so as to maintain the parallel alignment between its straight edge 56 and the runner 38.

In FIG. 11 there is illustrated still another manner in which the width of the slot 40 can be adjusted. The runner support 36 is not integrally formed with the sheet 14 but is, instead, formed as an integral part of a movable runner member 66 which includes the runner support 36, the runner 38, and a flat plate 68. The plate 68 is recessed to slidable fit within the blade cavity 28 and also receive a blade therein, in the same fashion that a blade is received and retained within the blade cavity 28. The side edges of the blade cavity 28 prevents the flat plate 68 from angularly shifting position. The flat plate 68 has an elongated aperture 70 therein for extending the bolt 33 through it, to fixedly secure the runner member 66 between the sheets 12 and 14. To adjust the width of the slot 40, the nut 32 and bolt 33 are merely loosened, to permit the position of the flat plate 68 in the blade cavity 28 to be adjusted to open or close the width of the slot 40.

Referring now to FIG. 3, it can be seen that the cutting blade 21 can be extended below the runner 38 so that the cutting device 10 also can be used as an ordinary knife blade. For this reason, the cutting blade preferably has an off-center aperture 35 therein, positioned above the centrally disposed aperture 34. To achieve a blade position which overrides the safety runner 38, the bolt 33 must be extended through the aperture 35. This will allow the cutting blade to be lowered beyond the edge of the runner 38 between predetermined minimum and maximum distance. For example, in an operative unit, the cutting blade extends a minimum of ⅜″ and a maximum of ½″ below the runner 38. The nut and bolt are again tightened, to secure the cutting blade in position, and it can be seen that the cutting blade therefore can penetrate to the established depth only, since the runner 38 will engage and glide over the surface of the object.

The cutting device is particularly designed to protect merchandise which is situated adjacent and/or in contact with the object being cut from being damaged. In this respect, it is extremely useful for opening shipping cartons and the like of cardboard or like material. By extending the cutting blade 21 below the runner 38, the cutting device 10 also can be used as an ordinary knife blade for cutting a whole host of different types of materials, such as roofing material, asphalt shingles and floor tiles, to mention but a few of them. Of course, these materials also can be cut by extending them through the slot 40 and engaging them with the cutting blade 21, or a shipping carton cut open using the cutting device with the blade exposed, as illustrated in FIG. 3. As far as opening cartons, however, the first described mode of using the cutting device is preferred, because of the protection afforded the merchandise within the carton.

As illustrated in FIG. 9, the cutting device 10 can be used as a string cutter also. If the string is about a carton, the string can be engaged with a hooking action using the runner 38. After being hooked, the string is drawn over the runner, through the slot 40, until it engages and is cut by the cutting blade 21.

The cutting device also can be placed within a holder 61 which has a clamp 63 or the like for affixing the holder to a shelf 64 or the like. The string is engaged by the runner 38 which generally forms a hook for catching the string and the string is pulled through the slot 40 and engaged with the cutting blade 21.

The device may also be used in an apparatus for cutting cartons as they traverse along a conveyor. In such instance, the device is positioned to pierce and then slit one side of the carton as it passes by the device.

It is apparent that the cutting device 10 can be fabricated from a single piece of material, rather than two, as illustrated. In such a case, a plate 54 as illustrated in FIG. 10 is preferably affixed to it so that the width of the slot 40 can be adjusted. Also, the handle can be formed with a hollow gripping portion pivotally affixed to the body portion of the cutting device, to provide a storage compartment for extra blades. Numerous other modifications can also be made without deviating from the novel design and function of the cutting device.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A cutting device especially adapted for opening shipping containers and the like of cardboard and similar material comprising a handle formed of two substantially similar shaped pieces of material which are pivotally affixed together at the handle end thereof, one of said pieces having a blade retaining portion at one end thereof, a runner affixed to said blade retaining portion in spaced relation therewith so as to form a slot extending substantially parallel with a surface of said blade retaining portion, said runner having a pointed tip for penetrating the walls of said shipping container adjacent the wall being cut, and a cross-section which is substantially convex-shaped to provide a smooth surface to prevent damaging objects engaged by said runner, a cutting blade having at least one cutting edge fixedly secured to said blade retaining portion, said cutting blade extending across and closing a portion of said slot, whereby a wall of said container may be penetrated by said pointed tip of said runner, and the adjacent wall severed with said cutting blade and the far-wall to said wall of said container penetrated by said tip and objects within said container engaged by the surface of said runner opposite said slot are protected from being slashed or cut by said cutting blade.

2. The cutting device of claim 1 further including means adjustably affixed to said blade retaining portion so as to be positionable to vary the width of said slot.

3. The cutting device of claim 1 wherein said blade retaining portion has a recessed cutting blade cavity therein which is substantially the size of said cutting blade and which is angularly disposed with respect to said slot, the side edges of said recessed cavity forming supports for said cutting blade and said cutting blade extending angularly across said slot.

4. The cutting device of claim 1 wherein said cutting blade is adjustably affixed to said blade retaining member and adapted to be positioned so that its cutting edge is extended and exposed beyond said runner to permit said cutting blade to be used to cut objects while sliding said runner across said objects.

5. The cutting device of claim 1 further including fastening means, said blade retaining portion having a slotted aperture formed therein for receiving said fastening means for adjustably affixing said cutting blade thereto, said cutting blade having an aperture therein through which said fastening means extend.

References Cited

UNITED STATES PATENTS

| | | | |
|---|---|---|---|
| 1,770,951 | 7/1930 | Smith | 30—287 |
| 2,187,590 | 1/1940 | Lurie | 30—2 |
| 2,555,142 | 5/1951 | Levin | 30—293 X |
| 2,601,414 | 6/1952 | Mittelstaedt | 30—294 |
| 2,810,194 | 10/1957 | Unsinger | 30—294 X |
| 3,178,812 | 4/1965 | Lurie | 30—2 |

FOREIGN PATENTS 21,320   1913   Great Britain.

JAMES L. JONES, JR., *Primary Examiner.*